T. Beach No Printed Specification Available
Pneumatic Propeller.
No. 5901X
Patented Apr. 2, 1830.
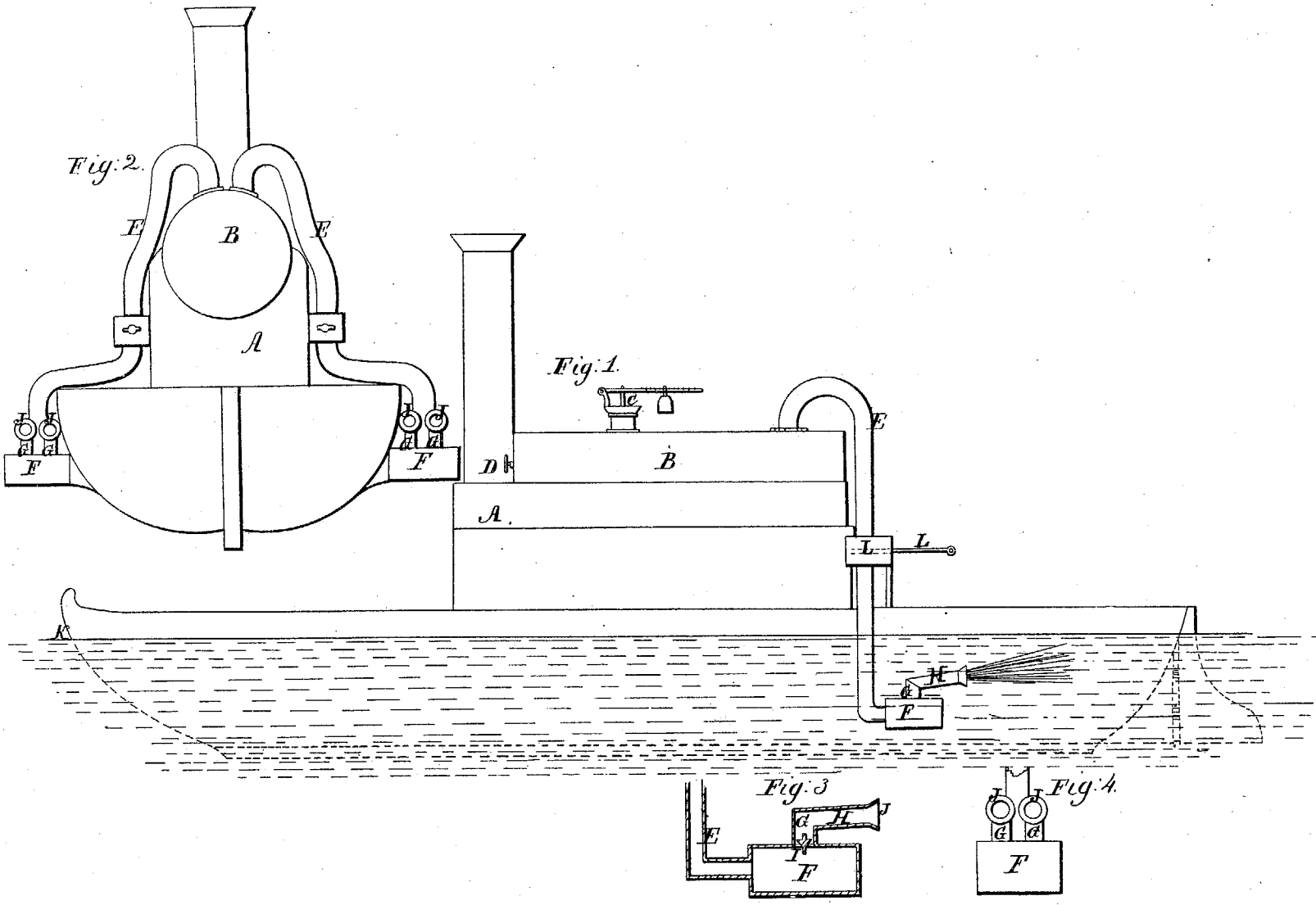
N. PETERS, PHOTO-LITHOGRAPHER, WASHINGTON, D. C.

X5701 April 2 1830 367

Timothy Beach of Clinton County Ohio

Letters Patent

The Schedule referred to in these Letters Patent and making part of the same containing a description
in the words of the said Timothy Beach himself of his improvement in the art of Propelling Boats To all to whom these presents shall come. Be it known that I Timothy
Beach of the County of Clinton and State of Ohio. have invented a new and useful improvement
in propelling Boats. & that the following is a full and exact description of the construction and
operation of said machine as invented or improved by me. Viz In the subjoined sketch A
is a furnace. B is the Boiler. C Safety valve. D trial cock. E. the pipe conducting the
steam from the boiler to the Steam Chest F. GG Perpendicular cylinders or tubes extending
from the steam chest to the horizontal or oblique tubes HH. II [illegible] [illegible] valves in the
under side of the oblique Tubes. JJ Issues in the ends of the tubes HH. The dotted
lines are intend to represent a Boat immersed in water to the horizontal line K
In consequence of the Boat being immersed in water, the valves II opening inwards
admit the water into the tubes HH and from thence into the perpendicular tubes or
cylinders G.G. The steam passes thro the pipe E into the steam chest F & by an
alternate motion of sliding valves the steam is permitted to act on the surface of the
Water in the Cylinders G.G. which causes the water to discharge with [illegible] velocity
at the Issues JJ. which acting against the surrounding water. impels the Boat for-
ward — What I claim as my invention or improvement is the application & construc-
tion generally of the above described machine;

Witnesses
Cyrus [illegible]
[illegible] Chew

Timothy Beach.

316 [illegible]